DETECTION OF TAPE DEFECTS BY MEANS OF
MULTIPLE BEAM INTERFERENCE
Filed June 29, 1964

INVENTORS
HAROLD FLEISHER
KURT M. KOSANKE
GLENN T. SINCERBOX
BY
Sughrue, Rothwell, Mion, Zinn & Macpeak
ATTORNEYS

United States Patent Office 3,391,599

Patented July 9, 1968

3,391,599

DETECTION OF TAPE DEFECTS BY MEANS OF MULTIPLE BEAM INTERFERENCE

Harold Fleisher, Poughkeepsie, Kurt M. Kosanke, Wappingers Falls, and Glenn T. Sincerbox, Poughkeepsie, N.Y., assignors to International Business Machines Corporation, New York, N.Y., a corporation of New York Filed June 29, 1964, Ser. No. 378,587
10 Claims. (Cl. 88—14)

ABSTRACT OF THE DISCLOSURE

Defects in a tape are detected by focusing a light beam of continuously varying frequency on the tape and detecting the interference pattern in the reflected light beam. When the beam is directed to a point on the tape which is free from a defect, the beam of continuously varying frequency is reflected from the single upper surface of the tape thereby forming no interference patterns in the reflected beam. However, when the beam of continuously varying frequency is directed at a point on the tape where a defect is located, the beam is reflected partially from the upper surface of a substrate layer and partially from the lower surface of a substrate layer. Reflections from the latter two surfaces combine, and due to the fact that the frequency of the light beam is continuously varying, the reflected beam will not have a continuous intensity but will develop an interference pattern in the form of constructive and destructive interference.

This invention relates to apparatus for detecting imperfections in coatings, more particularly, reflective coatings on light transmitting substrates.

The invention has a special utility in the inspection of record media of the type used in data processing, comprising a transparent base having a continuous coating of a light reflecting material. A specific example of such a record medium is a so-called "magnetic tape" formed of Mylar, coated with a magnetizable film, such as magnetizable metal, in such a way as to form a light reflective surface, for example, by electroplating. Magnetic tapes of this type are required to be capable of magnetization in discrete spots packed as closely as 3000 to the inch, for example. If the metal coating has a hole in any part of the area which is intended to receive magnetic recordings, the portion of the tape containing the imperfection is useless for data processing purposes.

Accordingly, it is an object of this invention to provide inspection means for reflective coatings on light transmitting substrates, capable of detecting extremely fine holes in the coating.

Another object is to provide an effective method for detecting extremely small holes in a reflective coating on a light transmitting substrate, without physical contact with the coating.

It is a further object to provide an inspection apparatus of the kind described which processes the tape expeditiously and automatically.

An additional object is to provide a method of generating a light beam characterized by time fluctuating constructive and destructive interference effects.

In accordance with the invention, these objects are achieved by scanning the surface of the coated sheet by incremental areas, with a beam of light normal to the sheet, composed of continuously changing wave bands, thereby producing a reflected beam of uniform intensity when reflected from an unblemished portion of the coated surface, but which exhibits a flicker produced by interference, whenever the beam is reflected from a blemished portion of the coating which allows it to pass through the surface layer and the substrate. The light is scanned through a spectrum of sufficient width to produce repeated intensity peaks for each traverse of the spectrum and the scanning of the spectrum occurs at much higher frequency than the scanning movement of the beam over the surface of the sheet. By transducing means the reflected beam is converted into an electrical signal which reproduces the modulations of the reflected light beam, so that they can be discriminated and made to control a marking means, for example, to identify the imperfect portion of the coated sheet.

While this specification will refer to light as the type of radiant energy used, other wave lengths outside of the visible spectrum can be used.

Other objects of the invention will be pointed out in the following description and claims and illustrated in the accompanying drawings, which disclose, by way of example, the principle of the invention and the best mode which has been contemplated of applying that principle.

Figure 1:
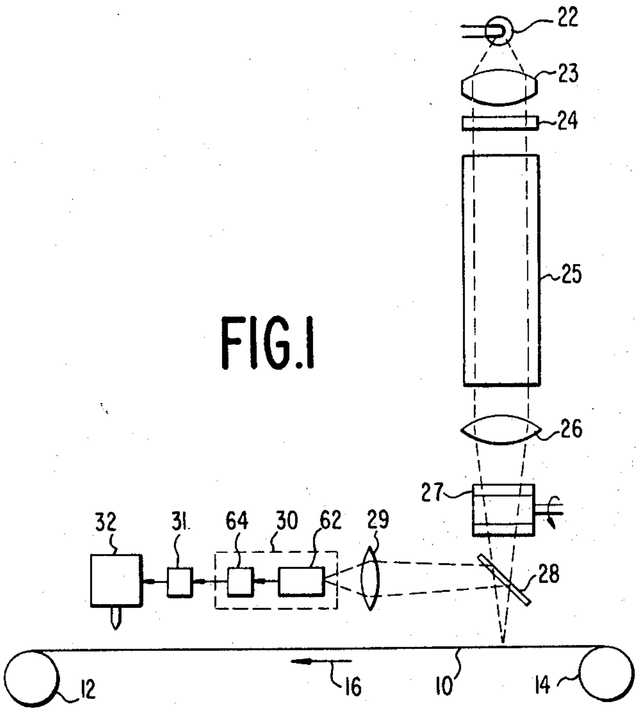
FIGURE 1 is a diagram of a complete apparatus for detecting blemishes in a coated tape.

By way of explanation of the invention it will be shown as embodied in an apparatus for testing plated magnetic tapes of the kind used in data processing machines. Such a tape is shown in FIGURE 1 at 10, stretched between a take-up roll 12 and a supply roll 14, the tape being drawn in the direction of the arrow 16 during the inspection operation. As shown in the detail view, FIGURE 2, the tape 10 is composed of a transparent plastic substrate 17, such as Mylar, which is a commercial product of Minnesota Mining and Manufacturing Co., commonly used for this purpose, plated with a metal layer 18, shown in FIGURE 2 as having an aperture 20 representing an imperfection of the tape. It is the object of the invention to detect such imperfections and to mark the portions of the tape containing them, so that they can be eliminated.

As shown in FIGURE 1, the inspecting apparatus includes a source 22 of light composed of a plurality of wavelengths. The light beam is collimated by a lens 23 and plane polarized by a polarizer 24, then passes into a filter-scanner unit 25, the construction of which will be described presently. The function of the filter-scanner is to convert the polarized beam of light into a beam composed of a succession of different wave bands changing continuously from one end of a spectrum to another. The light beam from unit 25 passes through a lens 26 to a beam scanner 27, which is a rotating octagonal mirror having the function of traversing the beam across the tape to inspect incremental areas. Since the tape is moving at the same time, the transverse paths along which the spot of light from the beam moves change progressively, so that the whole area of the tape is examined. Between the beam scanner and the tape is a beam splitter 28. This is a half silvered mirror which transmits approximately half of the light of the beam to the tape, in a direction normal to the tape. The light reflected from the tape returns along the incident path to the lower surface of the half silvered mirror, thence being deflected through a lens 29 to a discriminating unit 30 which determines, in a manner to be described, whether the light was reflected from a continuoust surface of the tape or from a blemished surface portion. In the latter case a signal is transmitted from the unit 30 through delay means 31 to a defect spot marker 32, which marks the blemished portion of the tape. The marker 32 may be any kind of a solenoid-operated device well known in the recording art.

The invention makes use of the fact that if the incident light beam, which strikes the tape normally, passes through a hole in the plated layer and is reflected from the bottom surface of the tape, the reflected beam external to the tape is composed of reflections from the upper and lower tape surfaces and is characterized by interference effects which enable it to be distinguished from the continuum of light which is reflected from the unblemished plated areas and develops no interference pattern.

Figure 4:
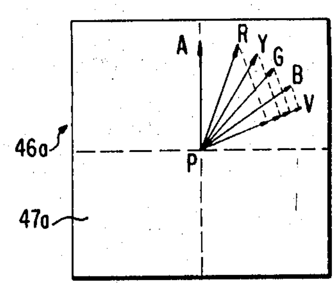
FIGURE 4 is a diagram taken transversely to FIGURE 3, showing the dispersion of the visible spectrum.
Figure 3:
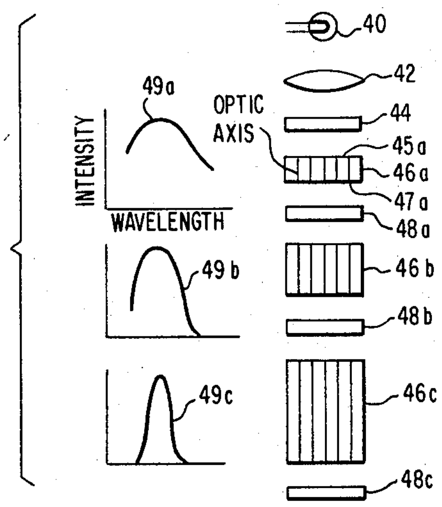
FIGURE 3 is a diagram showing means for color dispersion of a beam of white light, with accompanying intensity-versus-wavelength diagrams.

Before proceeding with a more detailed description of the apparatus, some properties of polarized light will be described with reference to FIGURES 3 and 4. Some transparent materials, for example quartz, have the ability, when properly oriented, to rotate the plane of polarization of a light beam passing through the material. The amount of rotation depends on the thickness of the material and also on the wavelength of the light used. Referring to FIGURE 3, if white light from a source 40, collimated by a lens 42, and polarized by a polarizer 44, strikes the upper face 45*a* of a quartz plate 46*a* oriented so that its optic axis is parallel to the light beam, the plane of the beam will not only be rotated, but the different wavelengths will be differentially rotated, as shown in FIGURE 4. In FIGURE 4, which shows the lower face 47*a* of the plate 46*a*, looking toward the approaching light beam, the plane of polarization of the light beam entering the upper face 45*a* of the plate 46*a* in FIGURE 3 is shown at AP. At the lower face 47*a* the polarization planes of the different wavelengths are dispersed at various angles from the plane AP, the smallest angle being that of the red wavelength PR and the largest angle that of the violet wavelengt PV. The different colors can be segregated by means of an analyzer 48, which is a polarizing plate oriented at the appropriate angle to transmit most favorably the desired color. Since other wave-lengths will have components of varying magnitude in the selected plane as indicated on the line VP in FIGURE 4, these colors will also appear in the emergent beam at lesser intensity than the principal color. A curve 49*a* of intensities plotted against wavelengths is shown in FIGURE 3 at the left plate 46*a*.

The curve 49*a* shows a rather broad wave band. In order to narrow the wave band the unit comprising a quartz plate and analyzer can be repeated any number of times, with the thickness of the quartz plate being doubled in each successive unit, as shown at 46*b*, 48*b* and 46*c*, 48*c* in FIGURE 3. If the quartz plate 46*a* has a thickness $t_0$, the second quartz plate 46*b* will have a thickness $2t_0$, the third $4t_0$, etc. The intensity curves will then appear as in FIGURE 3 at 49*b* and 49*c*.

Figure 5:
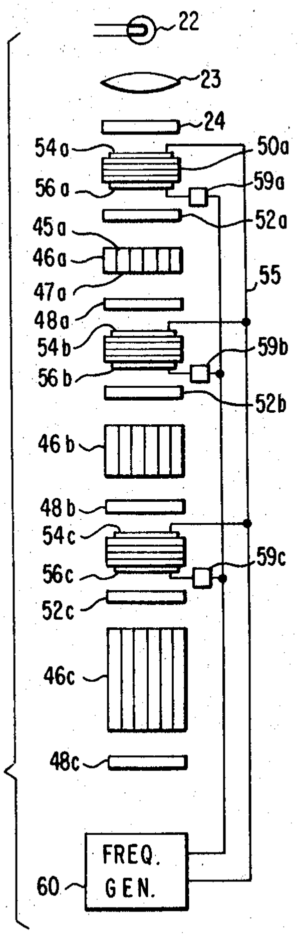
FIGURE 5 is a detailed diagram of an electro-optical filter-scanner which can be used in the apparatus shown in FIGURE 1.

It is evident that in FIGURE 3 the wave band issuing from the analyzer 48*c* can be changed by rotating the analyzers 48*a*, 48*b* and 48*c* or by changing the thickness of the quartz plates 46*a*, 46*b*, and 46*c*. The invention requires that the change of wave band be carried out continuously at a high frequency, in order to provide a beam which can distinguish blemished tape areas from acceptable ones. One way of accomplishing this is by inserting electro-optic rotating means between the successive units of the dispersion means shown in FIGURE 3. The resulting column of optical elements and electrical driving means is shown in FIGURE 5, which can be used as the filter-scanner unit 25 of FIGURE 1. Each elecrto-optical rotating unit comprises an electro-optical active crystal such as 50*a* and a properly oriented quarter wave plate 52*a*, both together acting as a Senarmon compensator. The plate 50*a* is cut perpendicular to its optic axis and its upper and lower faces are covered by transparent electrodes 54*a* and 56*a*. All of the upper electrodes 54*a*, 54*b* and 54*c* are connected by a wire 55 to one terminal of a frequency generator 60. The lower electrodes 56*a*, 56*b* and 56*c* are connected by a wire 57 to another terminal of the frequency generator. The necessary rotation of the plane of polarization for a certain change in wavelength is different in each unit. Therefore, voltage dividers 59*a*, 59*b* and 59*c* are used to apply the right voltage to each stage of the electro-optic crystal. The frequency generator is capable of establishing electrical potentials on the electrodes which generate a rapidly varying electric field across the space between the upper and lower electrodes of each electro-optic active crystal.

A beam of white light from source 22, collimated by lens 23 and polarized by polarizer 24, enters the upper face of the crystal 50*a* as a plane polarized beam. The beam is rotated through an angle depending upon the instantaneous intensity of the electric field across the electrodes 54*a* and 56*a*. The range of variation of this angle will depend upon the width of the spectrum to be used. By changing the potential on all of the electro-optic active crystals simultaneously a consistent angular relationship is maintained between them. The result that the light issuing from the lowermost analyzer 48*c* is scanned through a desired spectrum at a frequency determined by the period of the frequency generator, which may be 100 kc., for example.

The light beam emerging from analyzer 48*c*, is transmitted by lens 26, scanning mirror 27, and beam splitter 28 to the upper surface of the tape 10, where it forms a minute spot of light of constantly changing wave band, the instantaneous band width being very narrow. The spot of light is moved back and forth across the tape by the scanning mirror and its path across the tape changes progressively as a result of the movement of the tape. Thus, the beam completely scans the tape by incremental areas.

From all areas of the tape which have an unblemished coating the beam is reflected without change to the undersurface of the beam splitter 28, retracting the path of the incident beam. On reflection horizontally from the lower surface of the half silvered coating of the beam splitter it is focussed by lens 29 onto the face of a transducer 62 of discriminating unit 30. This transducer, which may be a photoelectric tube, for example, has the function of converting the energy of the light beam into an electrical signal, the character of which changes in dependence upon the nature of the light which it receives by reflection from the tape. Since the light reflected from an unblemished surface of the tape coating, though varying continuously as to wavelength, is substantially constant in intensity, the output from the photoelectric tube is substantially a DC voltage.

If, on the other hand, the beam striking the tape finds an imperfection which allows the light to pass through the plated coating of the tape, it is reflected from the bottom surface of the tape along the line of incidence and forms a composite beam with the beam reflected from the top surface of the tape.

Since the incident beam has a continuously changing wavelength, alternately constructive and destructive, interference occurs between the two reflected beams, causing a flicker of the light reflected to the transducer 62, which which responds by delivering a correspondingly modulated signal. The signal from transducer 62 is transmitted to a high pass filter 64, which blocks the DC signal generated by an unblemished tape surface, but passes the modulated signal derived from a blemished or imperfect area of the tape coating. A signal which passes the filter operates the defect spot marker 32, after a delay determined by the delay unit 31, so that a section of the tape containing the blemish is marked.

Figure 2:
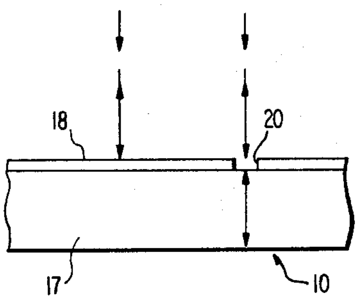
FIGURE 2 is a detail view of a portion of the tape showing a blemish.

To examine more critically the interference phenomenon which occurs when the scanning beam strikes a blemish in the tape, we refer to FIGURE 2, where the incident beam on the right is shown striking the tape surface normally at a point where an opening 20 in the plated coating 18 allows the beam to pass through the coating and to be reflected by the top and bottom surfaces of the plastic tape. The condition for a maximum of intensity due to interference of the two reflected beams results when the two wave trains combine in phase.

This can be stated by Equation 1

Eq. 1 $$k\lambda = 2nd$$

where:

$k$ is an integer
$\lambda$ is a wavelength
$n$ is the index of refraction
$d$ is the thickness of film, and 2 is introduced because the ray transmitted at the lower surface traverses $d$ twice before interfering with the ray reflected from the first surface.

Equation 1 is well known as the statement of Newton's rings for reinforcement at normal incidence.

For our purpose, we examine Equation 1 from the point of view of considering $k$, $\lambda$, and $d$ all variable. We shall assume that $n$ is constant (or reasonably so).

Accordingly, we write, in terms of $\Delta k$, $\Delta\lambda$, and $\Delta d$ by differentiation of Equation 1, the following:

Eq. 2 $$\frac{\Delta\lambda}{\lambda} + \frac{\Delta k}{k} - \frac{\Delta d}{d} = 0$$

Solving for $\Delta\lambda$:

Eq. 3 $$\Delta\lambda = \lambda\left[\frac{\Delta d}{d} - \frac{\Delta k}{k}\right]$$

We apply the analysis developed above to the problem of detecting a "blemish" on plated tape.

As we scan the blemish on the tape over the visible spectrum, we note variation of intensity of reflected light as a function of wavelength (due to interference phenomenon described above). The wavelength separation of adjacent peaks of intensity corresponds to a change in the number of waves in the wave train traversing the Mylar film by *one*.

Therefore, to obtain $\Delta\lambda$ as the wavelength separation of adjacent peaks we set $\Delta k = 1$ in Equation 3.

Thus, we get:

Eq. 4 $$\Delta\lambda_1 = \lambda\left[\frac{\Delta d}{d} - \frac{\lambda}{2nd}\right]$$

where $\Delta\lambda$, refers to a wavelength separation for $\Delta k = 1$. For a fixed thickness, $\Delta d = 0$, and Equation 4 simplifies to Eq. 5 $$\Delta\lambda_1 = \frac{-\lambda^2}{2nd}$$

For verification of the principle of the invention, measurements were made of a blemish on a plated tape having a Mylar foundation with a nominal thickness of 0.001 inch. Some of the results are shown below in:

TABLE 1

| $\lambda$ (A.) | $\Delta\lambda_1$ | $\lambda^2\Delta/\lambda_1$ (A.) |
|---|---|---|
| 4,750 | 30 | $7.53\times10^5$ |
| 5,000 | 82.5 | $7.69\times10^5$ |
| 5,500 | 38 | $7.96\times10^5$ |
| 6,000 | 50 | $7.21\times10^5$ |
| 6,400 | 57.5 | $7.13\times10^5$ |
| | | *$7.50\times10^5$ |

*Average.

Using the average value of $\Delta^2/\Delta\lambda_1$, from the table and assuming that the thickness of the Mylar substrate is 0.001 inch=0.00254 cm., we find from Equation 5 that the index of refraction $n \sim 1.48$. This agrees well with published information on index of refraction of Mylar.

It appears that the interference between the beam reflected from the top surface of Mylar and the beam reflected from the bottom surface of the Mylar can be used to determine the presence of a blemish. In the apparatus shown by way of example of the invention, we can electronically sweep through the desired spectrum by means of an electro-optic filter-scanner. We pick up the variation in intensity of the received signal as a function of wavelength, and by the sweep technique transform this into a function of time.

For example, if we sweep through 1000 A. centered at 5000 A. in a time interval T (for simplicity we assume rapid fly-back), we shall have about 25 intensity peaks in this time interval, from Table 1. If $T \sim 10$ musec, then the intensity peaks are received at a rate $\sim 2.5\times10^6$ peaks per second.

It is clear that frequency selection can now be used to distinguish a blemish from a good surface. Although it is desirable to have plating on the opposite surface of the Mylar tape to enhance the bottom surface reflection, it is not necessary.

The slope of the characteristics of the filter 64 is determined by the tolerances involved, the film thickness, the spectrum scan rate, the film transport rate, etc.

Instead of the octagonal mirror beam scanner shown in FIGURE 1, we may use an electro-optic light deflector for the type disclosed in Ser. No. 285,832, filed June 5, 1963. It is also possible to use a line beam across the width of the tape, since this, too, will generate a high frequency signal to operate the defect tape marker whenever there is a blemish in the tape.

Any other suitable means can be used, in place of the electro-optic filter-scanner means described above, for scanning through the wave bands composing the chosen spectrum. Also, the filter-scanner can be placed elsewhere in the light path between the source 22 and the transducer 62. Likewise, the sequence of optical elements in the column shown in FIGURE 5 can be altered; for example, the position of the electro-optic active crystals and the quarter wave plates, in relation to the quartz crystals, can be changed.

While there have been shown and described and pointed out the fundamental novel features of the invention as applied to the preferred embodiment, it will be understood that various omissions and substitutions and changes in the form and details of the device illustrated and in its operation may be made by those skilled in the art without departing from the spirit of the invention. It is the invention, therefore, to be limited only as indicated by the scope of the following claims.

What is claimed is:

1. Apparatus for detecting defects in the coating of a sheet comprising a light-transmitting base coated with a reflective layer which may have light transmitting blemishes: a source of light having a spectrum of wave bands; means to project a beam of said light upon different incremental areas of the coating of the sheet, in a direction normal to the sheet; the beam being reflected as continuous light from the surface of the coating of the sheet in incremental areas in which the coating is continuous, or passing through the coating in blemished areas, to be reflected from both the upper and lower surfaces of the base in two wave trains which are merged; light-responsive transducing means positioned to receive the reflected light and to generate an output signal; and means interposed in the path of said beam of light between said source and said transducing means for segregating different wave bands composing said beam and scanning through said different wave bands sequentially, to generate interference between the two wave trains reflected from blemished areas of the sheet, to modulate the light input to said transducing means; and means for discriminating the output signal generated by said transducing means from interference-modulated light from the output signal generated from continuous light.

2. Apparatus as described in claim 1, wherein said segregating and scanning means comprises means for dispersing the sepectrum of said beam of light, and means for selecting and sequentially transmitting differet wave bands of said dispersed spectrum.

3. Apparatus as described in claim 1, wherein said segregating and scanning means comprises means for angularly dispersing the spectrum of said beam of light about the axis of the beam, means for oscillating said dispersed spectrum about said axis, and means for sequentially transmitting wave bands of said spectrum as they pass through a particular angular position at the emergent end of said segregating and scanning means.

4. Apparatus as described in claim 3, wherein oscillating means comprises electro-optic active crystal means and means for applying a varying potential gradient thereto.

5. Apparatus as described in claim 1, wherein said segregating and scanning means is located in the portion of the path of said light beam between said source and the sheet.

6. Apparatus as described in claim 1, wherein said segregating and scanning means is located in the reflected portion of said light beam.

7. Apparatus as described in claim 1, wherein said transducing means is of the type which produces an electrical output signal in response to light incident thereon.

8. Apparatus as described in claim 7, wherein said discriminating means includes a highpass filter which blocks a substantially D.C. output signal from said transducer in response to continuous reflected light, but passes an output signal characterized by a frequency induced by interference-modulated reflected light.

9. Apparatus for detecting defects in the coating of a sheet comprising a light transmitting base coated with a reflective layer which may have light transmitting blemishes, means forming a beam of light composed of a spectrum of wave bands, means to scan said spectrum at a high rate while maintaining the overall intensity of the beam, means to project the beam upon different incremental areas of the coating of the sheet in a direction normal to the sheet, whereby the beam is reflected from the coating of the record in incremental areas on which the coating is continuous, or passes through a blemished areas of the coating and is reflected from both the upper and lower surfaces of the base in two wave trains which are merged and interfere alternately constructively and destructively as the spectrum is scanned through certain ones of its wave bands, and means for detecting interference in the reflected beam.

10. Apparatus as described in claim 8, characterized by marking means responsive to said interference detecting means to mark portions of the sheet in which blemished areas have been detected.

References Cited

UNITED STATES PATENTS

| | | | |
|---|---|---|---|
| 2,973,686 | 3/1961 | Dreyfus et al. | 88—14 |
| 3,145,252 | 8/1964 | Herriott | 88—14 |

JEWELL H. PEDERSEN, *Primary Examiner.*

B. LACOMIS, *Assistant Examiner.*

UNITED STATES PATENT OFFICE
CERTIFICATE OF CORRECTION

Patent No. 3,391,599 July 9, 1968

Harold Fleisher et al.

It is certified that error appears in the above identified patent and that said Letters Patent are hereby corrected as shown below:

Column 3, line 47, "left plate 46a" should read -- left of plate 46a --; line 59, after "48b" insert a comma. Column 4, line 22, "The result that" should read -- The result is that --; line 38, "retracting" should read -- retracing --. Column 5, line 46, "$\Delta\lambda$," should read -- $\Delta\lambda_1$ --; line 58, "$\lambda^2\Delta/\lambda$(A.)" should read -- $\frac{\lambda^2}{\Delta\lambda_1}$ (A.) --; line 66, "value of" should read -- value for --; same line 66, after "equation" cancel the comma and insert the same after "table". Column 6, line 22, "deflector for" should read -- deflector of --. Column 8, line 8, "blemished areas" should read -- blemished area --.

(SEAL) Signed and sealed this 13th day of January 1970.

Attest:

Edward M. Fletcher, Jr. WILLIAM E. SCHUYLER, JR.

Attesting Officer Commissioner of Patents